March 7, 1950 R. P. DE VAULT 2,499,371
EGG BEATER
Filed Nov. 21, 1947
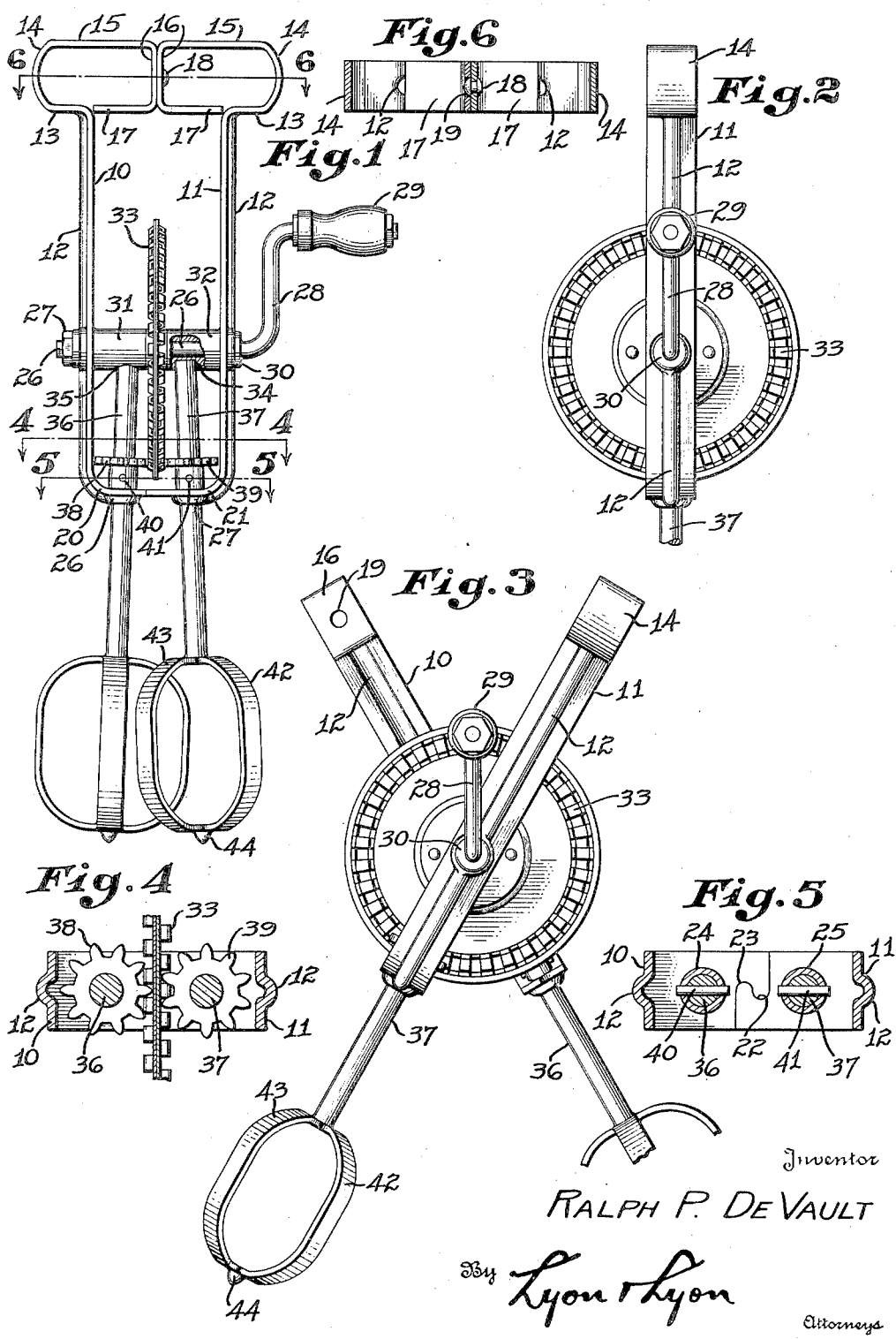
Inventor
RALPH P. DE VAULT
By Lyon & Lyon
Attorneys Patented Mar. 7, 1950

2,499,371

UNITED STATES PATENT OFFICE 2,499,371

EGG BEATER

Ralph P. De Vault, Arcadia, Calif.

Application November 21, 1947, Serial No. 787,444

4 Claims. (Cl. 259—131)

This invention relates to improvements in egg beaters, and more particularly to the provision in an egg beater of the type operated by hand to revolve a gear meshing with pinions to drive the beating members in which the handle and the beating elements are pivotally mounted so that both the handle member and the beating elements may be separated for ease in cleaning.

Accordingly, one object of this invention is to provide an egg beater of the type described in which the beating elements can be separated from each other to facilitate cleaning.

It is another object of this invention to provide such an egg beater which is simple, economical and durable of construction.

These and other objects will be apparent from the annexed specification in which:

Figure 1 is a front elevation of an egg beater embodying the present invention;

Figure 2 is a fragmentary side elevation of the beater shown in Figure 1;

Figure 3 is a fragmentary side elevation of a beater in its open position;

Figure 4 is a section taken along the line 4—4 of Figure 1;

Figure 5 is a section taken along the line 5—5 of Figure 1; and

Figure 6 is a section taken along the line 6—6 of Figure 1.

Referring now more particularly to the drawings, there is provided a frame including a pair of metal strips 10 and 11, each having a strengthening rib 12 thereon, the upper ends of which are bent outwardly as at 13, upwardly as at 14, inwardly as at 15, downwardly as at 16 and inwardly as at 17 to form the handle. A button 18 is provided on one of the downwardly bent portions 16 and the other of said downwardly bent portions 16 is provided with the hole 19 adapted to receive the button 18 when the handle is in closed position, as clearly indicated in Figure 6.

The frame members 10 and 11 also are bent inwardly at the bottom ends as at 20 aind 21 and are notched as at 22 and 23 for holding the two portions 20 and 21 together when in closed position as indicated in Figure 5.

The portions 20 and 21 are apertured as at 24 and 25 and bushings 26 and 27 are provided adjacent said apertures, which said bushings may be stamped into the metal of the frame members.

The frame members 10 and 11 are bored adjacent the midportion thereof to receive a shaft 26 having a nut 27 on one end and bent upwardly as at 28 to form a crank arm on which is mounted the handle 29. A washer or collar 30 is provided on the shaft 26 to hold the same in position on the frame.

Between the frame members 10 and 11 spacers 31 and 32 are mounted on the shaft 26 and keyed to the shaft 26 is a gear 33. The spacers 31 and 32 are bored as at 34 and 35 to receive the upper ends of the beater shafts 36 and 37, which shafts extend through the holes 24 and 25 in the portions 20 and 21 and gears 38 and 39 are secured to the shafts 36 and 37 as by the pins 40 and 41. The gears 38 and 39 are adapted to mesh with the gear 33 and are thereby driven upon rotation of the handle 28.

Each of the lower ends of the shafts 36 and 37 carries a pair of straps 42 and 43, each bent to form a somewhat flat circle fastened together as at 44 to form the beating elements.

By reason of the fact that the portions 20 and 21 are separable from each other and that the portions 16 of the handle are likewise separable from each other, and by reason of the further fact that frame members 10 and 11 are pivotally mounted on the shaft 26, the beater may be opened up as shown in Figure 3 with the shaft 37 offset from the shaft 36 and the beating elements separated as indicated. Furthermore, when in this position the handle elements also will be separated so that the entire beater is in a position in which all of its parts are readily accessible for cleaning.

While there has been described which is at present considered a preferred embodiment of the present invention, it will be apparent that various changes and modifications can be made without departing from the essence of the invention, and it is intended to cover herein all such changes and modifications as come within the true spirit and scope of the appended claims.

What is claimed is:

1. An egg beater comprising: a pair of frame members, each separately pivotally mounted on a shaft, a pair of beater shafts respectively mounted in said frame members, handle members on said frame members adapted in one position to detachably lock together, latch means for detachably latching said frame members together whereby said beater may be opened up with one of said frame members and its associated beater shafts pivoting in one direction on said transverse shaft and the other of said frame members and its associated beater shaft pivoting in the opposite direction, and gear means for rotating said beater shafts said gear means comprising a drive gear mounted coaxially with said first mentioned shaft and pinions carried by each of said beater shafts.

2. An egg beater comprising: a pair of frame members, each separately pivotally mounted on a shaft, a pair of beater shafts respectively mounted in said frame members, handle members on said frame members adapted in one position to detachably lock together, latch means for detachably latching said frame members together whereby said beater may be opened up with one of said frame members and its associated beater shafts pivoting in one direction on said transverse shaft and the other of said frame members and its associated beater shaft pivoting in the opposite direction, gear means for rotating said beater shafts, said gear means comprising a drive gear mounted coaxially with said first mentioned shaft and pinions carried by each of said beater shafts and a pair of beater elements respectively mounted on said beater shafts.

3. An egg beater comprising: a pair of frame members, each separately pivotally mounted on a transverse shaft, a pair of spacers mounted on said shaft, a gear keyed to said shaft, a pair of beater shafts respectively mounted in said frame members, gears mounted on said beater shafts and meshing with said first mentioned gear, handle members on said frame members adapted in one position to detachably lock together, latch means for detachably latching said frame members together whereby said beater may be opened up with one of said frame members and its associated beater shaft pivoting in one direction on said transverse shaft, the other of said frame members and its associated beater shaft pivoting in the opposite direction, and a crank for driving said central shaft.

4. An egg beater comprising: a pair of frame members, each separately pivotally mounted on a transverse shaft, a pair of spacers mounted on said shaft, a gear keyed to said shaft, a pair of beater shafts respectively mounted in said frame members, gears mounted on said beater shafts and meshing with said first mentioned gear, handle members on said frame members adapted in one position to detachably lock together, latch means for detachably latching said frame members together whereby said beater may be opened up with one of said frame members and its associated beater shaft pivoting in one direction on said transverse shaft, the other of said frame members and its associated beater shaft pivoting in the opposite direction, a crank for driving said central shaft, and a pair of beater elements respectively mounted on said beater shafts.

RALPH P. DE VAULT.

REFERENCES CITED

The following references are of record in the file of this patent:

UNITED STATES PATENTS

| Number | Name | Date |
| --- | --- | --- |
| 1,192,659 | Malloy | July 25, 1916 |
| 1,399,296 | Feeney | Dec. 6, 1921 |
| 1,921,342 | Bushnell | Aug. 8, 1933 |
| 1,968,502 | Nordby et al. | July 31, 1934 |